US012057572B2

(12) United States Patent
Jin et al.

(10) Patent No.: US 12,057,572 B2
(45) Date of Patent: Aug. 6, 2024

(54) METHOD FOR MANUFACTURING NEGATIVE ELECTRODE FOR LITHIUM SECONDARY BATTERY

(71) Applicant: LG ENERGY SOLUTION, LTD., Seoul (KR)

(72) Inventors: Gui Long Jin, Daejeon (KR); Seung He Woo, Daejeon (KR); Hyo Sik Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 585 days.

(21) Appl. No.: 17/331,293

(22) Filed: May 26, 2021

(65) Prior Publication Data
US 2021/0280859 A1 Sep. 9, 2021

Related U.S. Application Data

(63) Continuation of application No. PCT/KR2019/017035, filed on Dec. 4, 2019.

(30) Foreign Application Priority Data

Dec. 4, 2018 (KR) .................. 10-2018-0154290

(51) Int. Cl.
*H01M 10/0562* (2010.01)
*H01M 4/04* (2006.01)
(Continued)

(52) U.S. Cl.
CPC ........... *H01M 4/382* (2013.01); *H01M 4/043* (2013.01); *H01M 4/583* (2013.01);
(Continued)

(58) Field of Classification Search
CPC ...... H01M 4/382; H01M 4/043; H01M 4/583; H01M 10/0562; H01M 10/0565
See application file for complete search history.

(56) References Cited

U.S. PATENT DOCUMENTS

2009/0280406 A1* 11/2009 Kozuki ............ H01M 10/0431
429/209
2012/0105007 A1  5/2012 Amiruddin et al.
(Continued)

FOREIGN PATENT DOCUMENTS

CN      101326659 A    12/2008
CN      102823049 A    12/2012
(Continued)

OTHER PUBLICATIONS

Extended European Search Report for European Application No. 19891756.9, dated Jan. 11, 2022.
(Continued)

*Primary Examiner* — Olatunji A Godo
(74) *Attorney, Agent, or Firm* — Birch, Stewart, Kolasch & Birch, LLP (57) ABSTRACT

A method for manufacturing a negative electrode for a lithium secondary battery is provided in which the method is capable of effectively performing pre-lithiation. While a negative electrode is compressed with a press, a lithium alloy layer is formed on a portion in contact with a negative electrode active material layer of upper and lower plates of the press, and a negative electrode tab is electrically connected to the press through a connection part respectively disposed on the upper and lower plates of the press, and thus, it is possible to manufacture a negative electrode for a lithium secondary battery in which the pre-lithiation of the negative electrode may be performed at time of compression even without a separate pre-lithiation process.

14 Claims, 3 Drawing Sheets

(51) Int. Cl.
  *H01M 4/38*   (2006.01)
  *H01M 4/583*  (2010.01)
  *H01M 10/0565* (2010.01)
  *H01M 4/02*   (2006.01)

(52) U.S. Cl.
  CPC ... *H01M 10/0562* (2013.01); *H01M 10/0565* (2013.01); *H01M 2004/027* (2013.01)

(56) References Cited

U.S. PATENT DOCUMENTS

| | | | |
|---|---|---|---|
| 2013/0003261 A1* | 1/2013 | Remizov | H01G 11/06 361/527 |
| 2013/0040208 A1 | 2/2013 | Kanno et al. | |
| 2015/0236369 A1* | 8/2015 | Takatsuka | H01M 50/533 429/94 |
| 2016/0141596 A1 | 5/2016 | Uhm et al. | |
| 2016/0181594 A1 | 6/2016 | Balogh et al. | |
| 2017/0279101 A1* | 9/2017 | Sago | H01M 50/446 |
| 2018/0183084 A1* | 6/2018 | Min | H01M 8/1016 |
| 2018/0287209 A1 | 10/2018 | Hasegawa et al. | |
| 2019/0305298 A1 | 10/2019 | Chae et al. | |
| 2021/0135274 A1 | 5/2021 | Chae et al. | |

FOREIGN PATENT DOCUMENTS

| | | |
|---|---|---|
| CN | 102856532 A | 1/2013 |
| CN | 104620418 A | 5/2015 |
| CN | 107078256 A | 8/2017 |
| CN | 207398283 U | 5/2018 |
| CN | 108258306 A | 7/2018 |
| CN | 106128791 B | 11/2018 |
| JP | 2013-89625 A | 5/2013 |
| JP | 2017-50247 A | 3/2017 |
| JP | 2017-220447 A | 12/2017 |
| JP | 2018-142606 A | 9/2018 |
| JP | 2018-181451 A | 11/2018 |
| KR | 10-1999-0086308 A | 12/1999 |
| KR | 10-2004-0009583 A | 1/2004 |
| KR | 10-2017-0096352 A | 8/2017 |
| KR | 10-2018-0076954 A | 7/2018 |
| KR | 10-2018-0112659 A | 10/2018 |
| KR | 10-2018-0124723 A | 11/2018 |
| KR | 10-2018-0127044 A | 11/2018 |
| WO | 2015/016482 A1 | 2/2015 |

OTHER PUBLICATIONS

International Search Report issued in PCT/KR2019/017035 (PCT/ISA/210), dated Mar. 12, 2020.

* cited by examiner

METHOD FOR MANUFACTURING NEGATIVE ELECTRODE FOR LITHIUM SECONDARY BATTERY

CROSS-REFERENCE TO RELATED APPLICATIONS

This application is a Continuation of PCT International Application No. PCT/KR2019/017035, filed on Dec. 4, 2019, which claims priority under 35 U.S.C. 119(a) to Patent Application No. 10-2018-0154290, filed in the Republic of Korea on Dec. 4, 2018, all of which are hereby expressly incorporated by reference into the present application.

TECHNICAL FIELD

The present invention relates to a method for manufacturing a negative electrode for a lithium secondary battery, the method capable of effectively performing pre-lithiation, and more specifically, to a method for manufacturing a negative electrode for a lithium secondary battery in which while a negative electrode is compressed with a press for compression, a lithium alloy layer is formed on a portion in contact with a negative electrode active material layer of upper and lower plates of the press for compression, and a negative electrode tab is electrically connected to the press for compressions through a connection part respectively disposed on the upper and lower plates of the press for compression, and thus, the pre-lithiation of the negative electrode is performed at the time of compression even without a separate pre-lithiation process, and to a method for manufacturing a (all-solid) lithium secondary battery using the manufacturing method.

BACKGROUND ART

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

Meanwhile, as a positive electrode active material constituting a positive electrode of a lithium secondary battery, a metal oxide such as $LiCoO_2$, $LiMnO_2$, $LiMn_2O_4$, or $LiCrO_2$ is used, and as a negative electrode active material constituting a negative electrode of a lithium secondary battery, metal lithium, a carbon-based material such as graphite, or activated carbon, or a material such as a silicon oxide ($SiO_x$) is used. Among the negative electrode active materials, metal lithium was mainly used in the beginning. However, as the charge and discharge cycle proceeds, lithium atoms are grown on the surface of metal lithium and damage a separator, thereby damaging a battery, so that a carbon-based material has been mainly used, recently. However, the carbon-based material has a disadvantage in that the capacity thereof is small since the theoretical capacity of the carbon-based material is only about 372 mAh/g. Therefore, various studies have been conducted to replace the carbon-based material with a silicon-based material which has a high theoretical capacity (4,200 mAh/g) as the negative electrode active material.

The lithium secondary battery is charged and discharged by repeating a process in which lithium ions of the positive electrode active material of the positive electrode are intercalated and de-intercalated into the negative electrode active material (graphite) of the negative electrode.

In theory, the lithium intercalation and de-intercalation into the negative electrode active material layer is completely reversible. However, in practice, more lithium than the theoretical capacity of the negative electrode active material is consumed, and only a portion thereof is recovered. Therefore, after the second cycle, a smaller amount of lithium ions are intercalated during charging, but almost all the lithium ions intercalated are de-intercalated during discharging. The difference in capacity occurring in the first charge and discharge reaction is referred to as irreversible capacity loss. In a commercially available lithium secondary batteries, lithium ions are supplied from a positive electrode and a negative electrode is manufactured in a state without lithium, so that it is important to minimize the irreversible capacity loss in an initial charge and discharge.

The initial irreversible capacity loss is generally known to be attributed to an electrolytic decomposition reaction on the surface of a negative electrode active material, and a solid electrolyte membrane (SEI) film is formed on the surface of the negative electrode active material by an electrochemical reaction through the electrolyte decomposition. Since a large amount of lithium ions are consumed to form such an SEI film, there is a problem of causing irreversible capacity loss. However, the SEI film formed at the beginning of charging prevents a reaction between lithium ions and a negative electrode or other materials during charge and discharge, and serves as an ion tunnel to pass only lithium ions, thereby suppressing further electrolyte decomposition reactions to contribute to the improvement of the cycle properties of a lithium secondary battery.

Therefore, there is a need for a method for improving the initial irreversibility caused by the formation of the SEI film, and the like, and one method is to perform pre-lithiation prior to the manufacturing of a lithium secondary battery, so that side reactions occurring during a first charge are experienced in advance. In the case in which the pre-lithiation is performed as described above, when charging and discharging is performed on a secondary battery actually manufactured, the first cycle proceeds in a state in which the irreversibility is reduced, and thus, there is an advantage in that initial irreversibility may be reduced.

A typical pre-lithiation method includes, for example, a method of depositing lithium on a negative electrode, and a method of directly contacting a negative electrode with lithium. However, it is expensive to set up a device for deposition to deposit lithium on a negative electrode, and in the case of mass production, there is a disadvantage in that processibility is not good compared to the time required for the mass production.

Accordingly, there is a demand for the development of a new negative electrode for a lithium secondary battery in which more effective pre-lithiation may be achieved.

Meanwhile, there is also a demand for the development of an all-solid battery to which a solid electrolyte is applied instead of a typical liquid electrolyte for the development of a lithium secondary battery with improved safety.

PRIOR ART DOCUMENT

Patent Document (Patent Document 1) KR1999-0086308 A

DISCLOSURE OF THE INVENTION

Technical Problem

An aspect of the present invention is to provide a method for manufacturing an electrode for a lithium secondary battery in which pre-lithiation may be performed without performing a separate pre-lithiation process and a method for manufacturing a lithium secondary battery.

Technical Solution

According to an aspect of the present invention, there is provided a method for manufacturing a negative electrode for a lithium secondary battery, the method including forming a negative electrode active material layer on opposite sides of a negative electrode current collector to form a structure and placing the structure between upper and lower plates of a press and compressing the structure, wherein a lithium alloy layer is formed on a portion of each of the upper and lower plates of the press which are in contact with respective negative electrode active material layers of the structure, and a negative electrode tap protruding from one side of the negative electrode current collector and having no negative electrode active material is electrically connected to the press through a connection part respectively disposed on the upper and lower plates of the press, whereby pre-lithiation is performed at time of compression.

According to another aspect of the present invention there is provided a method for manufacturing an all-solid lithium secondary battery, the method including forming a negative electrode active material layer on opposite sides of a negative electrode current collector to form a structure, the negative electrode active material layer including a negative electrode active material and a first solid electrolyte, placing the structure between upper and lower plates of a press and compressing the structure to manufacture a negative electrode, applying a second solid electrolyte on at least one surface of the manufactured negative electrode to form a solid electrolyte film, laminating a positive electrode including a third solid electrolyte on an upper portion of the solid electrolyte film to form a laminate body, and casing the laminate body, wherein a lithium alloy layer is formed on a portion of each of the upper and lower plates of the press which are in contact with respective negative electrode active material layers of the structure, and a negative electrode tap protruding from one side of the negative electrode current collector and having no negative electrode active material is electrically connected to the press through a connection part respectively disposed on the upper and lower plates of the press, whereby pre-lithiation is performed at time of compression.

According to yet another aspect of the present invention there is provided a method for manufacturing a lithium secondary battery, the method including forming a negative electrode active material layer on opposite sides of a negative electrode current collector to form a structure, placing the structure between upper and lower plates of a press and compressing the structure to manufacture a negative electrode, laminating a separator on at least one surface of the manufactured negative electrode, laminating a positive electrode on an upper portion of the separator to form a laminate body, and receiving the laminate body in a battery container and injecting a liquid electrolyte into the battery container, wherein a lithium alloy layer is formed on a portion of each of the upper and lower plates of the press which are in contact with the negative electrode active material layers of the structure, and a negative electrode tap protruding from one side of the negative electrode current collector and having no negative electrode active material is electrically connected to the press through a connection part respectively disposed on the upper and lower plates of the press, whereby pre-lithiation is performed at time of compression.

Advantageous Effects

In the present invention, pre-lithiation is easily achieved without a complicate pre-lithiation process when lithium of a lithium alloy layer of a press for compression moves to an active material layer of a negative electrode at the time of compressing the negative electrode, so that the negative electrode manufactured according to the manufacturing method of the present invention secures initial reversibility to improve the electrochemical performance of a lithium secondary battery.

BRIEF DESCRIPTION OF THE DRAWINGS

The following drawing attached to the specification illustrates preferred examples of the present invention by example, and serves to enable technical concepts of the present invention to be further understood together with detailed description of the invention given below, and therefore the present invention should not be interpreted only with matters in such a drawing.

MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

A method for manufacturing a negative electrode for a lithium secondary battery according to the present invention includes forming a negative electrode active material layer on both sides of a negative electrode current collector, placing a structure between upper and lower plates of a press for compression and compressing the structure to manufacture a negative electrode, the structure having the negative electrode active material layer including a negative electrode active material and a first solid electrolyte formed on both sides of the negative electrode current collector, applying a second solid electrolyte on at least one surface of the manufactured negative electrode to form a solid electrolyte film, laminating a positive electrode including a third solid electrolyte on an upper portion of the solid electrolyte film, and casing the laminate body, wherein a lithium alloy layer is formed on a portion which is in contact with the negative electrode active material layer of the upper and lower plates of the press for compression, and a negative electrode tap protruding from one side of the negative electrode current collector and having no negative electrode active material is electrically connected the press for compression through a connection part respectively disposed on the upper and lower plates of the press for compression, whereby pre-lithiation is performed at the time of compression.

A method for manufacturing a secondary battery according to the present invention includes the aforementioned method for manufacturing a negative electrode, and may manufacture an all-solid lithium secondary battery or a lithium secondary battery using a liquid electrolyte.

Hereinafter, the method for manufacturing a negative electrode and the method for manufacturing a lithium secondary battery according to the present invention will be described in detail.

Method for Manufacturing Negative Electrode

Figure 1:
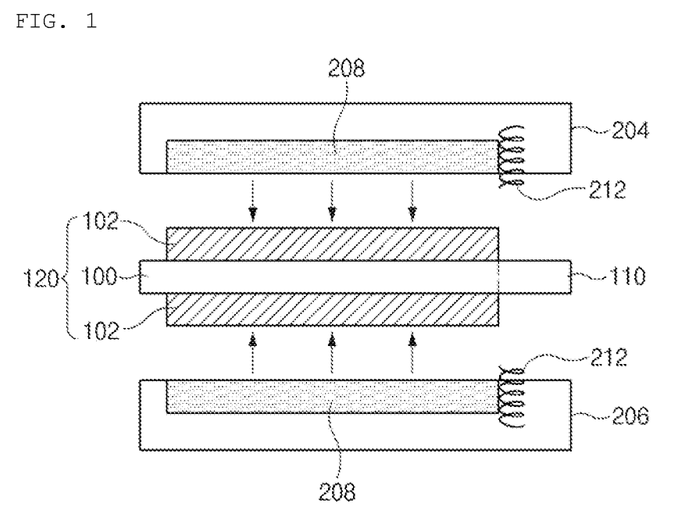
FIG. 1 is a view schematically illustrating a structure having a negative electrode active material layer formed on both sides of a negative electrode current collector in the state of being placed between upper and lower plates of a press for compression before being compressed in a method for manufacturing a negative electrode for a lithium secondary battery of the present invention.
Figure 2:
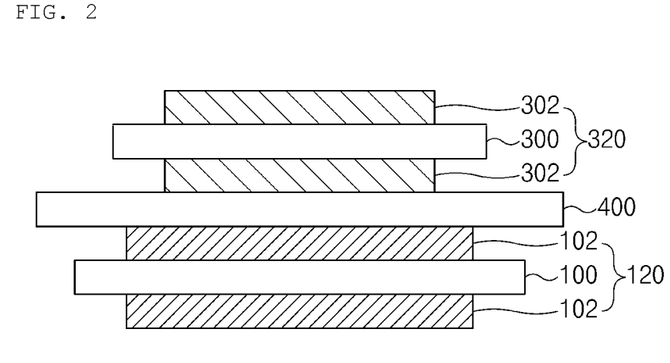
FIG. 2 is a view schematically illustrating a second solid electrolyte applied on a surface of the manufactured negative electrode to form a solid electrolyte film, and a positive electrode laminated on an upper portion of the solid electrolyte film to form a laminate body.
Figure 3:
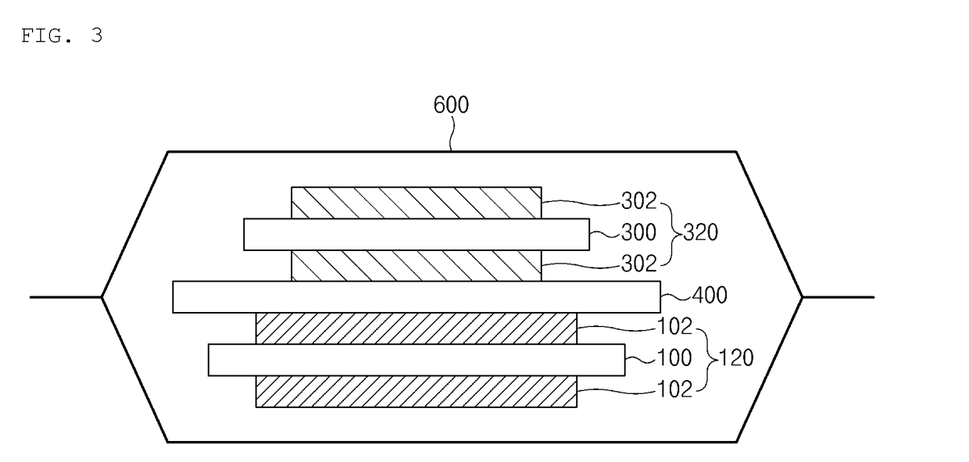
FIG. 3 is a view schematically illustrating casing the laminate body.
Figure 4:
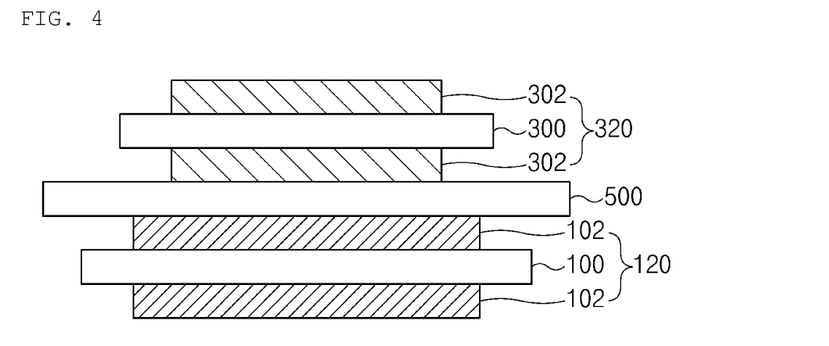
FIG. 4 is a view schematically illustrating a separator on a surface of the manufactured negative electrode, and a positive electrode laminated on an upper portion of the separator to form a laminate body.
Figure 5:
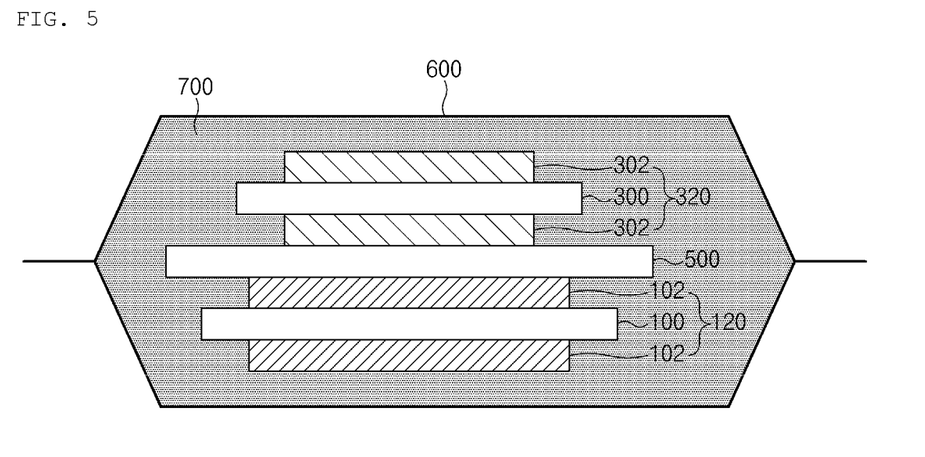
FIG. 5 is a view schematically illustrating receiving the laminate body in a battery container and injecting a liquid electrolyte into the battery container.

In the method for manufacturing a negative electrode of the present invention, a negative electrode active material layer 102 is first formed on both sides of a negative electrode current collector 100 (see FIG. 1).

The negative electrode active material layer formed on both sides of the negative electrode current collector may be formed at a ratio of 1:3 to 300 with respect to the thickness of the negative electrode current collector, and may be formed to a thickness of 50 μm to 2000 μm in general. If the thickness of the negative electrode layer is formed at a ratio smaller than 1:3 to the thickness of the current collector, capacity may be too small, and if formed at a ratio larger than 1:300, electrode resistance becomes great, so that charge/discharge may not be smoothly performed.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector 110 may typically have a thickness of 3 μm to 500 μm, and microscopic irregularities may be formed on the surface of the negative electrode current collector 110 to improve the adhesion of a negative electrode active material. For example, the negative electrode current collector may be used in various forms such as a film, a sheet, a foil, a net, a porous body, a foam, a non-woven body, and the like.

The negative electrode may be manufactured by dissolving or dispersing a conductive material and/or a binder in a solvent to prepare a negative electrode slurry and applying the negative electrode slurry on both sides of a negative electrode current collector, followed by compression.

The negative electrode active material may be one or more selected from the group consisting of a carbon-based material, a non-carbon-based material which is one or more selected from the group consisting of Si, Sn, Al, Sb, and Zn, or an oxide thereof, and a metal oxide selected from the group consisting of $Co_{x1}O_{y1}$ (1≤x1≤3, 1≤y1≤4), $Ni_{x2}O_{y2}$ (1≤x2≤3, 1≤y2≤4), $Fe_{x3}O_{y3}$ (1≤x3≤3, 1≤y3≤4), $TiO_2$, $MoO_2$, $V_2O_5$, and $Li_4Ti_5O_{12}$.

For example, the negative electrode active material is a mixed negative electrode active material of a silicon-based negative electrode active material and a carbon-based negative electrode active material, and may include the silicon-based negative electrode active material and the carbon-based negative electrode active material at a weight ratio of 1:99 to 50:50, preferably 5:95 to 20:80.

When the silicon-based negative electrode active material is included less than the above range, it is difficult to increase energy density, so that a high capacity of a battery may not be achieved. When the silicon-based negative electrode active material is included greater than the above range, the degree of volume expansion of a negative electrode may be increased.

The negative electrode active material may be included in an amount of 80-99 wt %, more specifically 85-98 wt % based on the total weight of the negative electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 0 wt % to 30 wt % based on the total weight of the negative electrode active material layer.

In addition, the binder serves to improve the bonding between negative electrode active material particles and the adhesion between a negative electrode active material and a current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the negative electrode active material layer.

Meanwhile, the solvent used in preparing the negative electrode slurry may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of the slurry.

Next, to continue to describe the method for manufacturing a negative electrode of the present invention with reference to FIG. 1, a structure 120 having the negative electrode active material layer 102 formed on both sides of the negative electrode current collector 100 is placed between an upper plate 204 of a press for compression and a lower plate 206 of the press for compression.

At this time, a lithium alloy layer 208 is formed on a portion in contact with the negative electrode active material layer 102 at the upper plate 204 and the lower plate 206 of the press for compression, and a negative electrode tap 110 protruding from one side of the negative electrode current collector 100 and having no negative electrode active material is electrically connected the press for compression through a connection part 212 respectively disposed on the upper plate 204 and the lower plate 206 of the press for compression.

After the structure 120 having the negative electrode active material layer 102 formed on both sides of the negative electrode current collector 100 is placed between the upper plate 204 of the press for compression and the lower plate 206 of the press for compression, the structure 120 is compressed using the upper plate and the lower plate of the press for compression. When the compression is performed, pre-lithation in which lithium ions in the lithium alloy layer 208 are diffused into the negative electrode active material layer 102 is achieved.

During the pre-lithation, lithium ions and electrons must be diffused together into the negative electrode active material layer, and electrons are diffused through the connection part 212 of the press for compression.

Meanwhile, when the negative electrode is used as a negative electrode of an all-solid lithium secondary battery, the negative electrode includes a solid electrolyte (a first solid electrolyte). This is because in an all-solid battery, lithium ions may be transferred to an active material only when an electrode includes a solid electrolyte. The solid electrolyte may be included in an amount of 1 wt % to 50 wt % based on the total weight of the negative electrode active material layer.

The solid electrolyte may be an inorganic solid electrolyte or an organic solid electrolyte.

The inorganic solid electrolyte may be an oxide-based inorganic solid electrolyte, a phosphoric acid-based inorganic solid electrolyte, a nitride-based inorganic solid electrolyte, a sulfide-based inorganic solid electrolyte, or a mixture thereof.

The oxide-based inorganic solid electrolyte may be a lithium-lanthanum-titanium oxide-based (LLTO) inorganic solid electrolyte, a lithium-lanthanum-zirconium oxide-based (LLZO) inorganic solid electrolyte, a LISICON-based inorganic solid electrolyte or a mixture thereof. The phosphoric acid-based inorganic solid electrolyte may be any one selected from a group consisting of a lithium-aluminum-titanium-phosphate-based (LATP) inorganic solid electrolyte, a lithium-aluminum-germanium-phosphate-based (LAGP) inorganic solid electrolyte, and a mixture thereof. The nitride-based inorganic solid electrolyte may be lithium phosphorous oxynitride (LiPON), and the sulfide-based inorganic solid electrolyte may be LiiOGeP$_2$S$_{12}$, Li$_2$S—P$_2$S$_5$, Li$_2$S—P$_2$S$_5$—LiI, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$Sn (wherein, m and n are positive numbers, and Z is any one of Ge, Zn, and Ga), Li$_2$S—GeS$_2$, Li$_2$S—SiS$_2$—Li$_3$PO$_4$, Li$_2$S—SiS$_2$—Li$_x$MO$_y$ (wherein x and y are positive numbers, and M is any one of P, Si, Ge, B, Al, Ga, and In), or a mixture thereof.

The organic solid electrolyte may be a polymer electrolyte formed by adding a polymer resin to a solvated lithium salt, and the polymer resin may be one or a mixture of two or more selected from the group consisting of polymers including a polyether-based polymer, a polycarbonate-based polymer, an acrylate-based polymer, a polysiloxane-based polymer, a phosphazene-based polymer, a polyethylene derivative, a polyethylene oxide (PEO), polyethylene glycol, an alkylene oxide derivative, a phosphoric acid ester polymer, polyalginate lysine, polyester sulfide, polyvinyl alcohol, polyvinylidene fluoride and an ionic dissociation group.

A lithium alloy constituting the lithium alloy layer 208 may be an alloy of lithium and one or more metals selected from the group consisting of aluminum, silicon, tin, and indium. When a negative electrode active material contains graphite, the lithium alloy constituting the lithium alloy layer may be an alloy of lithium and aluminum.

Also, the compression may be performed at a temperature of 25° C. to 200° C. and a surface pressure of 25 MPa to 500 MPa for 10 seconds to 60 minutes.

When compression is performed within the temperature and pressure and duration ranges, the negative electrode may be pre-lithiated while having an appropriate porosity.

Meanwhile, the connection part 212 is produced in the form of a spring, and the material thereof may be a material which may withstand above compression temperature and pressure and which may not react with a negative electrode material. In general, a metal, such as copper, which is used as a negative electrode current collector may be used.

Manufacturing of all-Solid Lithium Secondary Battery (Using Solid Electrolyte)

As described above, a pre-lithiated negative electrode is manufactured by compression, and on at least one surface of the negative electrode, a solid electrolyte (a second solid electrolyte) is applied to form a solid electrolyte film.

At this time, the negative electrode used for an all-solid lithium secondary battery includes a solid electrolyte (the first solid electrolyte) as described above.

The solid electrolyte film serves as both an electrolyte and a separator in the all-solid lithium secondary battery. As long as one selected from solid electrolyte (the first solid electrolyte) compounds which may be included in the above-described negative electrode is used, solid electrolyte films may be the same or different from each other.

Next, a positive electrode is disposed on the solid electrolyte film.

The positive electrode includes a positive electrode current collector and a positive electrode active material layer disposed on at least one surface of the positive electrode current collector.

The positive electrode may be manufactured according to a typical method for manufacturing a positive electrode known in the art. For example, the positive electrode may be manufactured by preparing a positive electrode slurry by dissolving or dispersing a positive electrode material, a solid electrolyte (a third solid electrolyte), a conductive material and/or a binder, and the like in a solvent and applying the positive electrode slurry on both surfaces of a positive electrode current collector, followed by drying and then compressing. Alternatively, the positive electrode may be manufactured by casting the positive electrode slurry on a separate support, and then laminating a film obtained by being peeled off from the support on a positive electrode current collector.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material may be, for example, a layered compound such as a lithium cobalt oxide ($LiCoO_2$) and a lithium nickel oxide ($LiNiO_2$), or a compound substituted by one or more transition metals; a lithium manganese oxide represented by Formula $Li_{1+y}Mn_{2-y}O_4$ (wherein y is 0 to 0.33), $LiMnO_3$, $LiMn_2O_3$, and $LiMnO_2$; a lithium copper oxide ($Li_2CuO_2$); a vanadium oxide such as $LiV_3O_8$, $LiV_3O_4$, $V_2O_5$, and $Cu_2V_2O_7$; a Ni-site type lithium nickel oxide represented by Formula $LiNi_{1-y}M_yO_2$ (wherein M=Co, Mn, Al, Cu, Fe, Mg, B, or Ga and y=0.01 to 0.3); a lithium manganese complex oxide represented by Formula $LiMn_{2-y}M_yO_2$ (wherein M=Co, Ni, Fe, Cr, Zn, or Ta, and y=0.01 to 0.1) or Formula $Li_2Mn_3MO_8$ (wherein M=Fe, Co, Ni, Cu, or Zn); $LiMn_2O_4$ in which a part of Li in the formula is substituted with an alkaline earth metal ion; a disulfide compound; $Fe_2(MoO_4)_3$, and the like, but is not limited thereto.

Also, the binder and the conductive material may be the same as those described above in the description of the negative electrode.

Meanwhile, when the positive electrode is used as a positive electrode of an all-solid lithium secondary battery, the positive electrode includes a solid electrolyte (the third solid electrolyte). This is because in an all-solid battery, lithium ions may be transferred to an active material only when an electrode includes a solid electrolyte.

As long as one selected from solid electrolyte (the first solid electrolyte) compounds which may be included in the above-described negative electrode is used, solid electrolytes may be the same or different from each other.

The prepared laminate body may be received (cased) in a container to manufacture an all-solid lithium secondary battery of the present invention.

The all-solid lithium secondary battery of the present invention includes a negative electrode pre-lithiated during compression as described above, and thus, has an advantage in that a separate pre-lithiation process is not required.

The all-solid lithium secondary battery such as the above refers to a battery in which a liquid or polymer electrolyte used in a typical lithium secondary battery is replaced with a solid electrolyte material. Since no flammable solvent is used in the battery, it is chemically stable, and at the same time, since no ignition or explosion caused by the leakage or the decomposition reaction of a typical electrolyte solution occurs, safety may be greatly improved. Also, since a Li metal or an Li alloy may be used as a negative electrode material, there is an advantage in that the energy density for the mass and volume of the battery may be significantly improved. Moreover, it is suitable for high energy densification by the lamination of an electrode and a solid electrolyte.

That is, according to the manufacturing method of the present invention described above, it is possible to manufacture an all-solid lithium secondary battery in which pre-lithiation is performed without a separate process while having the advantage of an all-solid lithium secondary battery.

Manufacturing of Lithium Secondary Battery (Using Liquid Electrolyte)

After manufacturing the pre-lithiated negative electrode by compression as described above, a separator is deposited on at least one surface of the negative electrode.

A solid electrolyte is not included in the negative electrode active material layer of the negative electrode.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable.

Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used.

Also, a coated separator including a ceramic component or a polymer material may be used to secure heat resistance or mechanical strength, and may be selectively used in a single-layered or a multi-layered structure.

Next, a positive electrode is disposed on the separation film.

The same positive electrode used in the all-solid battery described above may be used as the positive electrode except that the positive electrode does not contain a solid electrolyte.

After the positive electrode is disposed, the prepared laminate body is received in a battery container, and a liquid electrolyte is injected into the battery container to manufacture a lithium secondary battery of the present invention.

The liquid electrolyte is primarily an organic liquid electrolyte, and may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra-CN (where Ra is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte may be excellent when the cyclic carbonate and the chain carbonate are mixed in a volume ratio of about 1:1 to 9.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the liquid electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above liquid electrolyte components. At this time, the additive may be included in an amount of 0.1 wt % to 5 wt % based on the total weight of the electrolyte.

After the liquid electrolyte is injected, an impregnation step for the electrolyte solution is performed for 2 hours to 48 hours at a temperature of 10° C. to 100° C.

The impregnation may preferably be performed for about 2 hours to 36 hours at about 20° C. to 70° C.

If the impregnation temperature and duration are lower than 10° C. and less than 2 hours, respectively, electrolyte impregnation may not be sufficiently performed, and at a temperature exceeding 100° C., electrolyte vaporization may be grave.

The method for manufacturing a lithium secondary battery according to the present invention has been mainly described as a method for manufacturing a lithium secondary battery in the form of a mono-cell, but may be applied to various types of lithium secondary batteries.

Specifically, the lithium secondary battery of the present invention may be manufactured by a winding process, or may be manufactured by a lamination, stack process and/or a folding process of a separator and an electrode. In addition, the lithium secondary battery of the present invention may be applied to all of cylindrical, quadrangular, coin-type, pouch-type cases, and the like depending on the shape of a case, and may be, for example, a jelly-roll type, a stack type, a stack-folding type (including a stack-Z-folding type) or a lamination-stack type, depending on the shape received inside the case.

EXAMPLES

Hereinafter, the present invention will be described in detail with reference to Examples. However, the following Examples are merely illustrative of the present invention and are not intended to limit the scope of the present invention.

Example 1. Manufacturing of all-Solid Lithium Secondary Battery 80 wt % of a negative electrode active material (graphite), 3 wt % of a conductive material (Denka black), 3.5 wt % of a binder (SBR), 1.5 wt % of a thickener (CMC), and 12 wt % of a solid electrolyte (PEO6:LiTFSI) were added to acrylonitrile (AN) to prepare a negative electrode active material slurry. The prepared negative electrode active material slurry was coated on both sides of a copper current collector, and the copper current collector coated with the negative electrode active material slurry was dried, and compressed to manufacture a negative electrode.

At this time, the compression was performed using upper and lower plates 204 and 206 of a press for compression as disclosed in FIG. 1, and as a lithium alloy layer, one attached with a Li—Al alloy layer was used, and as a connection part 212, a spring made of copper was used.

The negative electrode was punched into a circular shape, and on an upper surface of the negative electrode, PEO6:LiTFSI was placed to a thickness of 0.1 mm as a solid electrolyte, and then pressed to attach the negative electrode and the solid electrolyte film. Then, on an upper surface of the solid electrolyte film, a LiCoO2, a positive electrode (as in the case of the negative electrode, a polymer solid electrolyte (PEO6:LiTFSI) is included in the positive electrode) was placed, and then pressed to attach the positive electrode. Through the manufacturing process of a cell as described above, a laminate body in the form of positive electrode/polymer solid electrolyte/negative electrode was prepared and received in a coin cell to manufacture a coin-type full-cell.

Example 2. Manufacturing of Lithium Secondary Battery Using Liquid Electrolyte 92 wt % of a negative electrode active material (graphite: SiO=7:3), 3 wt % of a conductive material (Denka black), 3.5 wt % of a binder (SBR), 1.5 wt % of a thickener (CMC) were added to water to prepare a negative electrode active material slurry. The prepared negative electrode active material slurry was coated on both sides of a copper current collector, and the copper current collector coated with the negative electrode active material slurry was dried, and compressed to manufacture a negative electrode.

The compression was performed in the same manner as in Example 1.

A polyolefin separator was interposed between the manufactured negative electrode and a $LiCoO_2$ positive electrode, and then the laminate body was received in a coin cell. Then, to a solvent prepared by mixing EC and EMC at a volume ratio of 3:7, 2 wt % of FEC was added, and an electrolyte solution in which $LiPF_6$ was dissolved at a concentration of 1 M was injected into the coin cell to manufacture a coin-type full cell.

Comparative Example 1

A coin-type full cell was manufactured in the same manner as in Example 1, except that stainless steel was used instead of the Li—Al alloy layer attached to the upper and lower plates of the press for compression.

Comparative Example 2

A coin-type full cell was manufactured in the same manner as in Example 2, except that stainless steel was used instead of the Li—Al alloy layer attached to the upper and lower plates of the press for compression.

Experimental Example 1: Experiment of Cycle Charge/Discharge

The coin-type full cell prepared in each of Examples and Comparative Examples was tested for reversibility using an electrochemical charge/discharge device. When charging, the charging was performed by applying a current at a current density of 0.1 C-rate up to a voltage of 4.2 V (vs. Li/Li$^+$), and when discharging, the discharging was performed to a voltage of 3.0 V with the same current density. The first cycle charge/discharge efficiency is shown in Table 1 below.

The charge-discharge experiment was conducted at 60° C. for Example 1 and Comparative Example 1 to which a solid electrolyte was applied, and the experiment was conducted at room temperature for Example 2 and Comparative Example 2 to which a liquid electrolyte was applied.

At this time, the initial efficiency was calculated by the following equation:

Initial efficiency (%)=(discharge capacity of 1 cycle/ charge capacity of 1 cycle)×100

TABLE 1

|  | Charge/discharge efficiency after first cycle (%) |
| --- | --- |
| Example 1 | 85 |
| Example 2 | 85 |
| Comparative Example 1 | 65 |
| Comparative Example 2 | 80 |

As shown in Table 1 above, the initial reversibility efficiency of each of Examples 1 and 2 was much higher than that of each of Comparative Examples 1 and 2. This is determined to be due to the fact that pre-lithiation was achieved only by a compression process at the time of manufacturing the negative electrode without a complicated process. In the case of Comparative Examples 1 and 2, a compression process was performed but lithium ions could not move because an alloy layer containing lithium was not used in the compression press, and thus pre-lithiation was not achieved. Therefore, the charge/discharge efficiency of each of Comparative Examples 1 and 2 was lower than that of each of Examples 1 and 2.

The invention claimed is:

1. A method for manufacturing a negative electrode for a lithium secondary battery, the method comprising:
    forming a negative electrode active material layer on opposite sides of a negative electrode current collector to form a structure; and
    placing the structure between upper and lower plates of a press and compressing the structure, wherein
    a lithium alloy layer is formed on a portion of each of the upper and lower plates of the press which are in contact with respective negative electrode active material layers of the structure, and
    a negative electrode tap protruding from one side of the negative electrode current collector and having no negative electrode active material is electrically connected to the press through a connection part respectively disposed on the upper and lower plates of the press, whereby pre-lithiation is performed at time of compression.

2. The method of claim 1, wherein the negative electrode active material layer comprises a solid electrolyte together with the negative electrode active material when the negative electrode is used in the manufacturing of an all-solid lithium secondary battery.

3. The method of claim 2, wherein the solid electrolyte is at least one of an inorganic solid electrolyte film or an organic solid electrolyte film.

4. The method of claim 1, wherein a lithium alloy constituting the lithium alloy layer is an alloy of lithium and one or more metals selected from the group consisting of aluminum, silicon, tin, and indium.

5. The method of claim 1, wherein, when a negative electrode active material constituting the negative electrode active material layer contains graphite, a lithium alloy constituting the lithium alloy layer is an alloy of lithium and aluminum.

6. The method of claim 1, wherein the compressing is performed at a temperature of 25° C. to 200° C. and a surface pressure of 25 MPa to 500 MPa for 10 seconds to 60 minutes.

7. The method of claim 1, wherein the connection part is made of a copper material.

8. The method of claim 1, wherein the connection part is a spring.

9. A method for manufacturing an all-solid lithium secondary battery, the method comprising:
    forming a negative electrode active material layer on opposite sides of a negative electrode current collector to form a structure, the negative electrode active material layer including a negative electrode active material and a first solid electrolyte;
    placing the structure between upper and lower plates of a press and compressing the structure to manufacture a negative electrode;
    applying a second solid electrolyte on at least one surface of the manufactured negative electrode to form a solid electrolyte film;
    laminating a positive electrode including a third solid electrolyte on an upper portion of the solid electrolyte film to form a laminate body; and
    casing the laminate body, wherein
    a lithium alloy layer is formed on a portion of each of the upper and lower plates of the press which are in contact with respective negative electrode active material layers of the structure, and
    a negative electrode tap protruding from one side of the negative electrode current collector and having no negative electrode active material is electrically connected to the press through a connection part respectively disposed on the upper and lower plates of the press, whereby pre-lithiation is performed at time of compression.

10. The method of claim 9, wherein the first, second, and third solid electrolytes are the same.

11. The method of claim 9, wherein the first, second, and third solid electrolytes each independently comprise at least one selected from an inorganic solid electrolyte and an organic solid electrolyte.

12. A method for manufacturing a lithium secondary battery, the method comprising:
    forming a negative electrode active material layer on opposite sides of a negative electrode current collector to form a structure;
    placing the structure between upper and lower plates of a press and compressing the structure to manufacture a negative electrode;

laminating a separator on at least one surface of the manufactured negative electrode;

laminating a positive electrode on an upper portion of the separator to form a laminate body; and receiving the laminate body in a battery container and injecting a liquid electrolyte into the battery container, wherein a lithium alloy layer is formed on a portion of each of the upper and lower plates of the press which are in contact with respective negative electrode active material layers of the structure, and a negative electrode tap protruding from one side of the negative electrode current collector and having no negative electrode active material is electrically connected to the press through a connection part respectively disposed on the upper and lower plates of the press, whereby pre-lithiation is performed at time of compression.

13. The method of claim 1, wherein the connection part respectively disposed on the upper and lower plates is configured to move with the upper and lower plates of the press relative to the structure.

14. The method of claim 12, wherein the connection part respectively disposed on the upper and lower plates is configured to move with the upper and lower plates of the press relative to the structure.

* * * * *